United States Patent
Pitu

(10) Patent No.: US 10,474,796 B2
(45) Date of Patent: Nov. 12, 2019

(54) METHOD OF WRITING DATA TO A MEMORY DEVICE AND READING DATA FROM THE MEMORY DEVICE

(71) Applicant: Siemens Aktiengesellschaft, Munich (DE)

(72) Inventor: Ciprian-Leonard Pitu, Brasov (RO)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 15/543,157

(22) PCT Filed: Jan. 14, 2016

(86) PCT No.: PCT/EP2016/050667
§ 371 (c)(1),
(2) Date: Jul. 12, 2017

(87) PCT Pub. No.: WO2016/113350
PCT Pub. Date: Jul. 21, 2016

(65) Prior Publication Data
US 2018/0011995 A1    Jan. 11, 2018

(30) Foreign Application Priority Data

Jan. 15, 2015 (EP) .................................. 15464002

(51) Int. Cl.
| | | |
|---|---|---|
| *G06F 21/14* | (2013.01) | |
| *G06F 12/14* | (2006.01) | |
| *G09C 1/00* | (2006.01) | |
| *H04L 9/32* | (2006.01) | |
| *G06F 21/12* | (2013.01) | |
| *G06F 21/75* | (2013.01) | |

(52) U.S. Cl.
CPC .......... *G06F 21/14* (2013.01); *G06F 12/1408* (2013.01); *G06F 21/123* (2013.01);
(Continued)

(58) Field of Classification Search
CPC .... G06F 21/14; G06F 12/1408; G06F 21/123; G06F 21/75; G06F 21/10; G06F 21/70;
(Continued)

(56) References Cited

U.S. PATENT DOCUMENTS 9,703,989 B1 * 7/2017 Pedersen ................. G06F 21/75
2009/0327709 A1   12/2009 Garner et al.
(Continued)

FOREIGN PATENT DOCUMENTS

| WO | WO2009/024913 A2 | 2/2009 |
|---|---|---|
| WO | WO2009/024913 A4 | 2/2009 |

(Continued)

OTHER PUBLICATIONS

Saleem Wehbe et. al, "Mutual Authentication Scheme for EPC TagsReaders in the Supply Chain", IEEE (Year: 2009).*
(Continued)

*Primary Examiner* — Shanto Abedin
(74) *Attorney, Agent, or Firm* — Cozen O'Connor

(57) ABSTRACT

A method of writing data to a memory device and reading data from the memory device includes issuing a challenge to a PUF device during a power-up process in order to derive a PUF response, error correcting the PUF response, providing delinearized addresses via a delinearization algorithm to the memory device using the error corrected PUF response, masking data, which is written to the memory device, via a masking module using the error corrected PUF response, de-masking data, which is read from the memory device, via the masking module (19) using the error corrected PUF response; and performing a check-sum verification of read data such that address delinearization and data masking are used together to obfuscate the memory content.

11 Claims, 2 Drawing Sheets

(52) U.S. Cl.
CPC ............... *G06F 21/75* (2013.01); *G09C 1/00* (2013.01); *H04L 9/3278* (2013.01); *H04L 2209/12* (2013.01)

(58) Field of Classification Search
CPC .......... G06F 21/71; G06F 21/73; G06F 21/12; G06F 21/121; G06F 21/76; G09C 1/00; H04L 9/3278
See application file for complete search history.

(56) References Cited

U.S. PATENT DOCUMENTS

| | | | | |
|---|---|---|---|---|
| 2011/0215829 | A1* | 9/2011 | Guajardo Merchan | G06F 7/588 326/8 |
| 2012/0066571 | A1* | 3/2012 | Marinet | G06F 21/73 714/773 |
| 2014/0181986 | A1* | 6/2014 | Guo | G06F 21/10 726/26 |
| 2015/0188717 | A1* | 7/2015 | Wu | G09C 1/00 380/44 |

FOREIGN PATENT DOCUMENTS

| | | |
|---|---|---|
| WO | WO2009/024913 A9 | 2/2009 |
| WO | WO2014/053286 | 4/2014 |

OTHER PUBLICATIONS

Sandeep Bhatkar et al., "Address Obfuscation: an Efficient Approach to Combat a Broad Range of Memory Error Exploits", Usenix Association, 12th Usenix Security Symposium, Jul. 29, 2003, pp. 1-17 (2003).

* cited by examiner

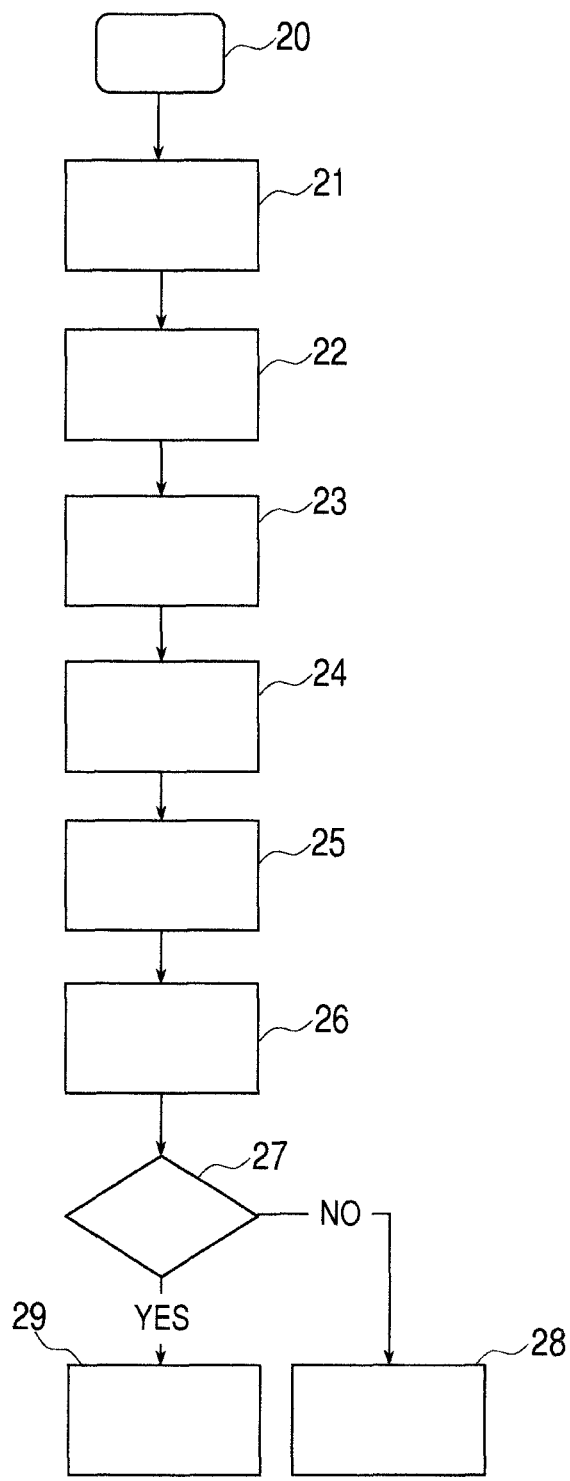

US 10,474,796 B2

METHOD OF WRITING DATA TO A MEMORY DEVICE AND READING DATA FROM THE MEMORY DEVICE

CROSS-REFERENCE TO RELATED APPLICATIONS

This is a U.S. national stage of application No. PCT/EP2016/050667 filed 14 Jan. 2016, and claims priority to European application No. 15464002 filed Jan. 15, 2015, the content of which is incorporated herein by reference in its entirety.

BACKGROUND OF THE INVENTION

1. Field of the Invention

The invention relates to a method of writing data to a memory device and reading data from the memory device, and to a system on chip for implementing the method.

2. Description of the Related Art

Generally, an interaction of a system on chip (SoC) with an external memory device constitutes threats. In order to avoid security attacks, such as sniffing, the memories need to be protected.

A common solution to provide protection is cryptography. In some circumstances, however, this approach is not the right choice. An alternative solution is address obfuscation. US2009/0327709-A1 discloses a method of address obfuscation, which is simple to apply but leaves the actual data unprotected. If the instruction set is known and a memory dump can be executed the memory can be de-obfuscated easily and therefore the original memory content is reconstructed.

SUMMARY OF THE INVENTION

In view of the foregoing, it is an object of the invention to provide an improved method for protecting external memory content.

This and other objects and advantages are achieved in accordance with the invention by a method of writing data to a memory device and reading data from the memory device, which includes issuing a challenge to a PUF device during a power-up process to derive a PUF response, error correcting the PUF response, providing delinearized addresses via a delinearization algorithm to the memory device using the error corrected PUF response masking data, which is written to the memory device, via a masking module using the error corrected PUF response-masking data, which is read from the memory device, via the masking module using the error corrected PUF response and performing a check-sum verification of read data.

In order to mitigate attacks, such as sniffing, the method in accordance with the invention uses a delinearization approach for an address bus and a masking approach for the data. Thus, address delinearization and data masking are used together to obfuscate the memory content.

With a Physical Unclonable Function (PUF), a unique response is challenged. With this unique response, the delinearization of the addresses and the masking or de-masking of data is performed.

In an advantageous embodiment of the method, the check-sum verification is performed by using a cyclic error-correcting code. Error-correcting codes provide the ability to identify and to locate any error, whereas a cyclic code is an especially useful kind of error-correcting code.

An improvement of the method comprises an additional step of generating a reset signal in case of data falsification to reset a processor that interacts with the memory device. Thus, a reset occurs immediately, if a device with this implemented method is corrupted.

Moreover, it is advantageous if the data is masked with the error corrected PUF response using the XOR operator, and if the data is revealed out of masked data with the error corrected PUF response using an XOR operator. Such a data transformation is fast and needs little computing power.

An advantageous embodiment of the method utilizes a PUF device with silicon physical unclonable functions of a system on chip that comprises a processor and a memory controller. Thus, the achieved memory obfuscation relies on the PUF device that exploits unique physical characteristics of a silicone device.

Each silicon device is uniquely characterized yielding the same unique memory patterns, making reverse engineering attacks, based on memory dumps, practically impossible.

As no enrollment phase is needed, the silicon device can be directly shipped to a customer. The solution can even be applied to a bootloader. Changes to the bootloader would be detected, if the bootloader is stored in the ROM memory via the memory controller and thus the memory obfuscation module.

It is also an object of the invention to provide a system on chip which comprises a processor, a memory controller and a memory obfuscation module that is connected to a data bus and to a address bus, where the memory obfuscation module is set up to implement the above-described method in accordance with the disclosed embodiments.

In a specific embodiment, the obfuscation module comprises the PUF device, an address delinearization module and a data masking module. Thus, the inventive structure is implemented in hardware and is adjacent to the memory controller without modifying it.

In order to correct an insufficient PUF response the obfuscation module comprises an error correction module connected to the PUF device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described hereinafter in more detail and by way of example, with reference to the drawings, in which:

FIG. 3 is a flowchart illustrating the method of memory obfuscation and de-obfuscation in accordance with the invention.

DETAILED DESCRIPTION OF THE EXEMPLARY EMBODIMENTS

Figure 1:
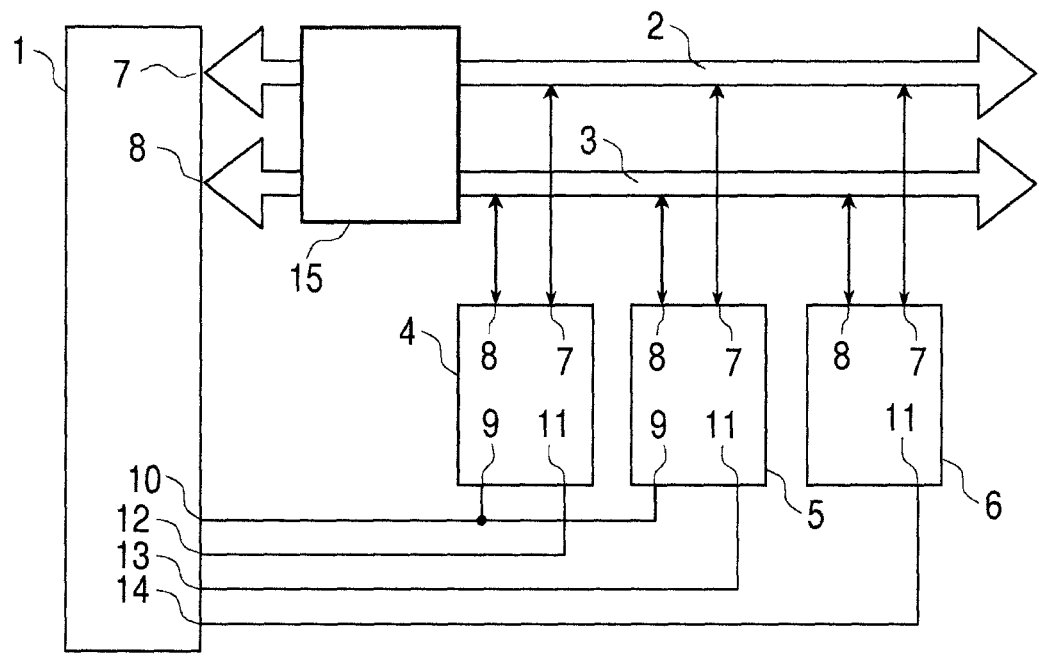
FIG. 1 is a device structure in accordance with the invention.

FIG. 1 shows a system on chip (SoC) with a memory controller 1 that is connected to an address bus 2 and a data bus 3. Via theses busses 2, 3, addresses and data are exchanged with various memory devices 4, 5, 6, such as RAM 4, rewritable memory 5 or ROM 6. For this purpose the memory controller 1 and the memory devices 4, 5, 6 comprise address connections 7 and data connections 8.

The RAM 4 and the rewritable memory 5 comprise R/W'-inputs 9, which are connected to a corresponding output 10 of the memory controller 1. Additionally, each memory device 4, 5, 6 comprises a CE-input 11 that is respectively connected to a corresponding CS-output 12, 13, 14 of the memory controller 1.

The memory controller 1 is responsible for accessing the external memories 4, 5, 6 attached to the SoC. The memory controller 1 sets the address on the address bus 2 and reads or writes the data via data bus 3.

Adjacent to the memory controller 1 the inventive obfuscation module 15 is connected to the busses 2, 3. In particular, the obfuscation module 15 is arranged between the memory controller 1 and the memory devices 4, 5, 6.

Figure 2:
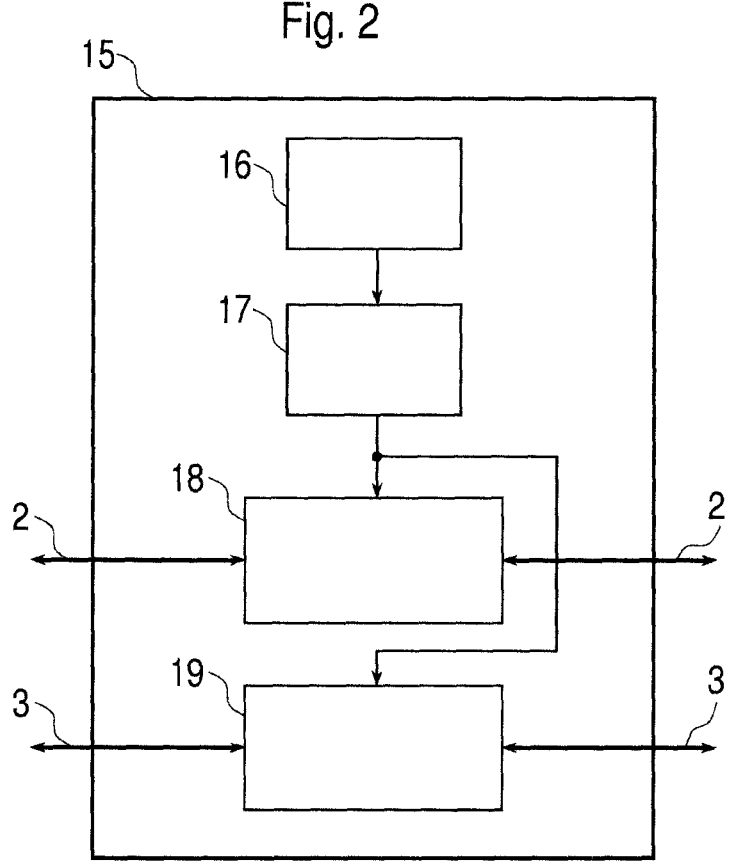
FIG. 2 is a structure of a memory obfuscation module in accordance with the invention.

The obfuscation module 15 is shown in FIG. 2 in detail. Obfuscation module 15 comprises a PUF device 16 that responds to a challenge with a unique output by utilizing a silicon physical unclonable function.

The PUF device 16 utilizes the fact that no integrated circuit (IC) is similar to another because of production process variations. For example, path delays vary enough across ICs to use them for identification. Therefore, PUF provides a direct link between the physical properties of the silicon device and the security level provided.

The output of the PUF device 16 is input to an error correction module 17 to make the PUF response consistent.

The error corrected PUF response is used in the obfuscation structure as such, i.e., in an address delinearization module 18 and in a data masking module 19.

The address delinearization module 18 is connected to the address bus 2 and delinearizes the exchanged addresses. The data masking module 19 is connected to the data bus 3 and masks or de-masks the exchanged data.

The different method steps are described with reference to the flowchart shown in FIG. 3.

During power-up (step 20) the PUF device 16 is challenged (step 21). As a result the PUF response is derived 22. In a next step (23), the PUF response is error corrected. Next, the error corrected PUF response is then passed to the address delinearization (address obfuscation) (step 24) and data masking or de-masking is performed (step 25).

Address delinearization (step 24) and masking or de-masking (step 25) are implemented with any known mathematically proven theory in order to realize the needed functionality. Address delinearization (step 24) randomizes the addresses of code and data segments. For this purpose, the error corrected PUF response is considered as random response.

During the write operation, the addresses are delinearized and the data to be written is masked with the error corrected PUF response. During the read operation, the same addresses are selected as before but the data is de-masked, thus revealing the original data.

In order to check the validity of the read data, check-sum verification (step 26) is performed. For this purpose the cyclic error-correcting code (CRC) is preferred.

If the silicon device is subject to any physical attacks, the PUF response changes, thus yielding wrong addresses and wrong data during the de-masking operation. In this case, the validity decision (step 27) of the check-sum is NO.

There are different possibilities for a reaction (step 28). The simplest way is to issue an alarm. A more sophisticated approach is to reset a processor (CPU) of the SoC, whereas any attack is blocked immediately.

If the check-sum verification (step 26) results in a YES-decision, an execution (step 29) of the loaded code is performed.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of writing data to a memory device and reading data from the memory device, comprising:
   issuing a challenge to a Physical Unclonable Function (PUF) device during a power-up process to derive a PUF response;
   error correcting the PUF response;
   providing delinearized addresses via a delinearization algorithm to the memory device using the error corrected PUF response;
   masking data, which is written to the memory device, via a masking module using the error corrected PUF response during a write operation;
   de-masking data, which is read from the memory device, via the masking module using the error corrected PUF response during a read operation; and
   performing a check-sum verification of read data.

2. The method of claim 1, wherein the check-sum verification is performed by using a cyclic error-correcting code.

3. The method of claim 2, further comprising:
   generating a reset signal in case of data falsification to reset a processor which interacts with the memory device.

4. The method of claim 2, wherein the data is masked with the error corrected PUF response using an XOR operator; and wherein the data is revealed out of masked data with the error corrected PUF response using the XOR operator.

5. The method of claim 1, further comprising:
   generating a reset signal in case of data falsification to reset a processor which interacts with the memory device.

6. The method of claim 5, wherein the data is masked with the error corrected PUF response using an XOR operator; and wherein the data is revealed out of masked data with the error corrected PUF response using the XOR operator.

7. The method of claim 1, wherein the data is masked with the error corrected PUF response using an XOR operator;

and wherein the data is revealed out of masked data with the error corrected PUF response using the XOR operator.

8. The method of claim 1, wherein the PUF device utilizes silicon physical unclonable functions of a system on chip which comprises a processor and a memory controller.

9. A system on chip comprising:
a processor;
a memory controller; and
a memory obfuscation module which is connected to a data bus and an address bus and is connected between the memory controller and memory devices;
wherein the memory obfuscation module is configured to:
  issue a challenge to a Physical Unclonable Function (PUF) device during a power-up process to derive a PUF response;
  error correct the PUF response;
  provide delinearized addresses via a delinearization algorithm to a memory device using the error corrected PUF response;
  mask data, which is written to the memory device, via a masking module using the error corrected PUF response;
  de-mask data, which is read from the memory device, via the masking module using the error corrected PUF response; and
  performing a check-sum verification of read data.

10. The system of claim 9, wherein the obfuscation module comprises the PUF device, an address delinearization module and a data masking module.

11. The system of claim 10, wherein the obfuscation module comprises an error correction module connected to the PUF device.

\* \* \* \* \*